United States Patent [19]

Ferrara

[11] Patent Number: 5,010,805
[45] Date of Patent: Apr. 30, 1991

[54] POTATO CHIP MAKER INCLUDING APPARATUS FOR CENTRIFUGALLY REMOVING COOKING OIL FROM ANY PRODUCT

[76] Inventor: Daniel A. Ferrara, Looking Glass Rd., Bantam, Conn. 06750

[21] Appl. No.: 406,470

[22] Filed: Sep. 13, 1989

[51] Int. Cl.⁵ ............................................ A41J 37/12
[52] U.S. Cl. ........................................ 99/353; 99/357; 99/407; 99/511
[58] Field of Search .................. 99/403, 407, 409–415, 99/353, 352, 355, 357, 348, 510–513; 426/464, 518, 523, 637, 438, 473; 241/92; 83/409.1, 411.2, 411.3, 411.7

[56] References Cited

U.S. PATENT DOCUMENTS

| | | | |
|---|---|---|---|
| 241,631 | 5/1881 | Duffy | 99/414 |
| 1,759,921 | 5/1930 | Tarpley | 99/413 |
| 2,186,345 | 1/1940 | Reidenbach | 99/353 |
| 2,628,738 | 2/1953 | Hilldale | 99/413 |
| 2,858,762 | 11/1958 | Wade | 99/348 |
| 3,078,986 | 2/1963 | Arvan | 99/407 |
| 3,200,737 | 8/1965 | Ferenc | 99/410 |
| 3,279,353 | 10/1966 | Shelor | 99/407 |
| 3,357,685 | 12/1967 | Stephens | 99/348 |
| 4,187,770 | 2/1980 | Coffield | 99/353 |
| 4,196,660 | 4/1980 | Steinberg | 99/353 |

FOREIGN PATENT DOCUMENTS

| | | | |
|---|---|---|---|
| 449899 | 9/1927 | Fed. Rep. of Germany | 99/410 |
| 985833 | 7/1951 | France | 99/409 |

Primary Examiner—Timothy F. Simone
Attorney, Agent, or Firm—Dallett Hoopes

[57] ABSTRACT

A potato chip maker comprises a heated container having a cover. The container encloses a two-piece basket including a separately supported bottom wall and a side wall. Both walls are suspended from a shaft centrally depending from the cover.

The shaft is driven from outside the container by a crank through a one-way clutch and may be stepped around as the crank is pivoted back and forth over a blade in the cover. The crank has means to hold a potato which is cut into chips and other shapes by being brought back and forth across the blade. Because of the rotation of the basket, successive chips land in separate areas of the basket and do not contact and stick to each other. After the chips are cooked the basket is manually drawn upwardly above the oil for a centrifugal draining spin as the crank is again manipulated. Thereafter the bottom wall of the basket is raised separately from the side wall to a level at least as high as the top of the side wall. At this position the bottom wall is in line with the bottom of an opening in the side cover of the container. The opening may have a "spout" angled tangent to the container and in the direction of most natural spin of the basket. The basket assembly is then spun by the crank to eject finished chips out of the opening in the side or the cover of the container.

The apparatus of the invention also has more general application. For instance, in the cooking of French fries, other vegetables, fish, chicken, etc. the basket may be raised above the oil, drained and cranked around to centrifically spin off the residual oil.

9 Claims, 4 Drawing Sheets

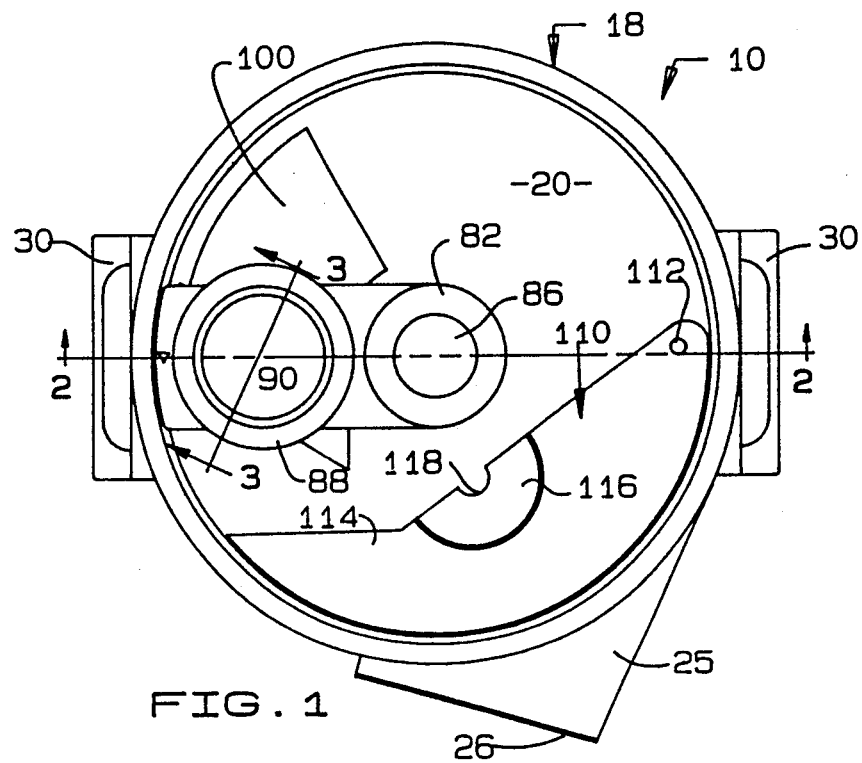
FIG. 1
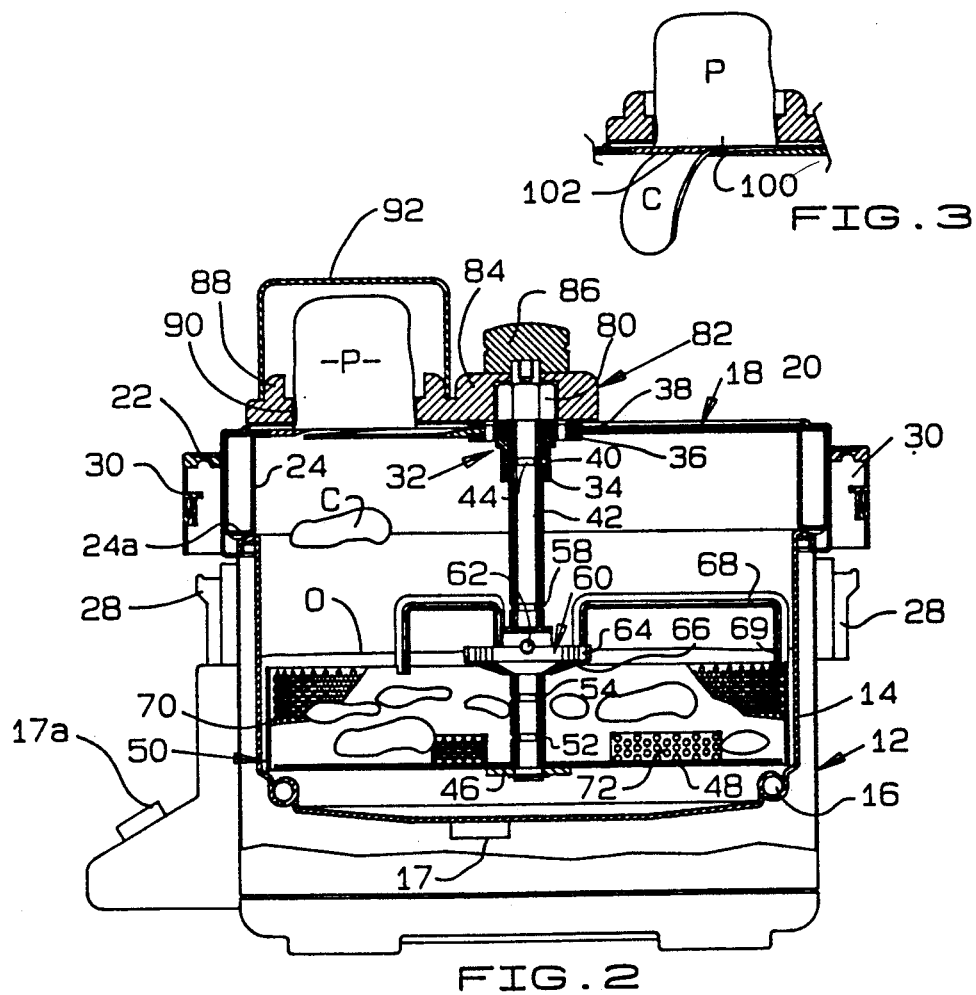
FIG. 3
FIG. 2

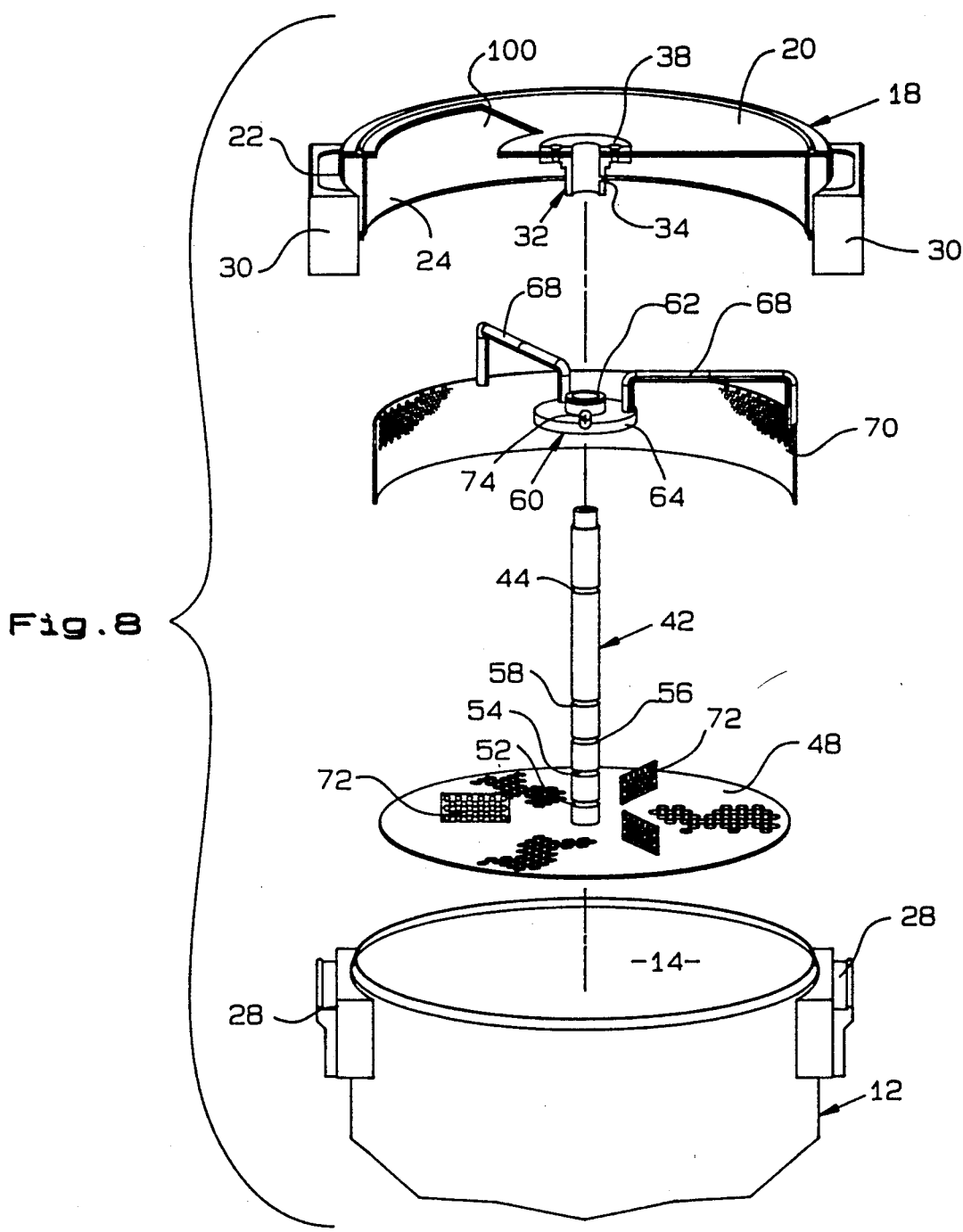

POTATO CHIP MAKER INCLUDING APPARATUS FOR CENTRIFUGALLY REMOVING COOKING OIL FROM ANY PRODUCT

BACKGROUND OF THE INVENTION

1. Field of the Invention

This invention relates to potato chip makers. More specifically the invention relates to a potato chip maker in which a single apparatus provides for the appropriate cutting of the raw potato, cooking of the chip, draining of the chip and ejection of the finished chip.

Broadly, the invention may be defined also as including apparatus to centrifugally separate cooking oil from cooked products. This is in the form of a basket which may be manually spun to spin off the oil through openings in the basket.

2. Description of the Related Art Including Information Disclosed Under §§1.97–1.99

In the prior art there have been patents on apparatuses dedicated to the making of potato chips in the home. An example is U.S. Pat. No. 4,196,660 to Thomas K. Steinberg which issued Apr. 8, 1980. In this apparatus raw potatoes are pressed outward and are rotated against a circumferential wall having fixed knives. As the potatoes rotate, slices are severed by the knives, the slices dropping down into hot oil in a pan-like heated container. After they are cooked the potatoes are raised by a foraminous basket and permitted to drain, the hot oil falling into the reservoir at the bottom of the pan.

The U.S. Pat. No. 4,187,770 to Coffield features a horizontally disposed whirling disc having a cutter blade therein and means to hold the raw potato stationary against the disc. Slices severed by the cutter fall into hot oil. After the chips are cooked, a basket, which closely conforms to the wall of the pan, is raised and the potato slices are allowed to dry.

SUMMARY OF THE INVENTION

Unlike the earlier devices, the present apparatus is concerned very much with keeping the potato chip slices separated from each other so that they are permitted to cook uniformly and drain uniformly without contacting other chips in a way which might produce spotty cooking, sticking together or partial drying. Further distinguishing from the prior art, the present maker may be adjusted externally of the apparatus so that it need not be opened during the cooking, draining or ejecting process.

Summarizing the present invention, it is a potato chip maker comprising a container having a cover which mounts a slicing blade over a hole in the cover. Central of the cover is a bearing, and a shaft extends through the bearing and is rotatable by a crank above the cover. Inside the container the shaft mounts a foraminous basket which is in two parts: the floor or bottom wall of the basket is attached centrally to the lower end of the shaft; the circumferential side wall of the basket is shaped and supported by a spider which extends outward from a slidable hub on the shaft. The crank is attached to the shaft by a one-way clutch and the crank has means to hold a raw potato over the blade.

By holding a raw potato in the crank, one can pivot the crank back and forth cutting slices off the bottom of the potato, the slices falling into the basket at spaced points as the basket is stepped around by the one-way clutch. The basket is 90° submerged in the hot cooking oil and has raised vanes to move the chips.

The basket may then be raised for draining the chips by spinning. Subsequently, with the side wall fixed, the floor of the basket can be raised by the same shaft and rotated briskly by the crank to eject chips out a door in the side of the unit.

BRIEF DESCRIPTION OF THE DRAWINGS

Other objects and features of the invention will be apparent from a study of the following specification and reference to the drawings, all of which are non-limiting. In the drawings:

FIG. 1 is a top plan view of an apparatus embodying the invention;

FIG. 2 is a sectional view taken on the line 2—2 in FIG. 1;

FIG. 3 is a fragmentary sectional view on the line 3—3 in FIG. 1 showing the slicing operation;

FIG. 8 is an exploded prospective view of a portion of the apparatus; and

DESCRIPTION OF THE PREFERRED EMBODIMENT

Figure 4:
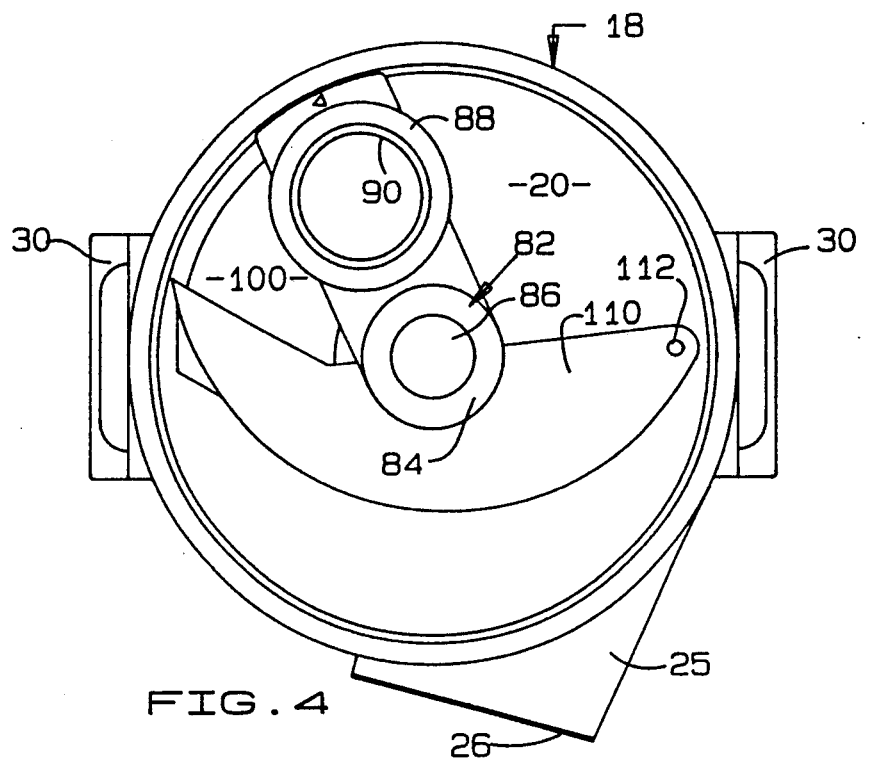
FIG. 4 is a view similar to FIG. 1 but showing the blade cover and shaft support in their operative position.

An apparatus embodying the invention is generally designating 10 in FIG. 1. It comprises a pot-like container 12 (FIG. 2) including an outer shell and an inner liner 14 having a heating element 16 controlled by a thermostat 17 which is connected to an on-off switch and temperature selector 17a activated by means not shown.

Over the top of the container 12 is a cover 18 comprising a flat top wall 20 and a depending side wall 22 which is formed with an integral spaced inner wall 24 having an outward annular seat 24a provided with a downward facing gasket which sits on the top of the liner 14. The side wall 22 may be formed with an outlet passage 25 with a discharge door 26.

Handles 28 are provided on the container and handles 30 are provided on the side wall of the cover.

Generally the parts may be made of stainless steel or aluminum. The outer shell of the container 12 may be made of thin coated sheetmetal. The handles are of plastic.

Mounted centrally of the top wall 20 of the cover is a bearing 32 which includes a central bored boss 34 having an outward flange 36 at its upper end, and an annular mounting ring 38. As shown (FIG. 2) fasteners may clamp the top wall 20 between the flange 36 and the mounting ring 38. In the top wall 20 is an opening aligned with the opening in the ring 38 and the bore in the boss 34.

Figure 9:
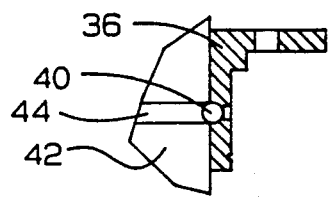
FIG. 9 is an enlarged fragmentary sectional view of a shaft detent as taken, for instance, at 9—9 in FIG. 2.

A detent 40 is provided in the boss 34 (FIG. 9) for reasons which will appear. As shown in FIG. 9, the detent comprises a spring pressed ball 41, urged inwardly toward the axis of the boss.

Extending in vertically adjustable fashion through the bore in the boss 34 is the shaft 42. The shaft is formed with an annular peripheral groove 44 which in the lowermost position of the shaft is engaged by the ball of the spring detent 40. The lower end of the shaft 42 (FIG. 2) is provided with an annular flange 46 held on the shaft by butting upward against the shoulder at the reduced lower end of the shaft and held up from below by a C-clip. To the annular flange 46 is secured the foraminous bottom wall 48 of a basket 50. The bottom wall is keyed to turn with the shaft by friction fit between the parts.

On the shaft spaced above the bottom wall 48 are a plurality of grooves 52, 54, 56 and 58 (FIG. 8).

A hub 60 surrounds the shaft 42 and is provided with a spring detent 62 similar to detent 40, the ball of which engages in a selected groove 52, 54 and 56. The hub 60 comprises an annular collar 64 having an inwardly sloping lower surface 66 to avoid trapping chips between the hub 60 and the wall 48. Spaced uniformly about the upper surface of the collar are inverted "U"-shaped spokes 68 extending up from the collar, having comparatively long horizontal runs and then extending down to their outer terminals. To these terminals are attached the annular side wall 70 of the basket 50.

Lower wall 48 of the basket extends out to stop a short distance inward of the lower end of the side wall 70. The upper surface of the wall is provided with radial vanes 72 which, like the bottom wall 48 of the basket and side wall 70, are preferably perforated. The ball of the detent 62 nests into a selected one of the grooves 52, 54, 56 or 58 of the shaft.

The upper end of the shaft above the bearing 32 is provided with a one-way clutch 80 (FIG. 2) which has a hexagonal outward shape. A crank 82 having a hub 84 has an upward central recess shape to conform to the nut outline of clutch 80 so that the two elements are keyed for rotary movement together. The upper end of the shaft 42 is drilled centrally and tapped to receive a bolt in the center of a knob 86 securing the crank on the shaft.

A crank arm 88 extends outward from the crank hub 84 and is formed with a central potato-receiving opening 90. An inverted cup-shaped hand guard 92 (FIG. 2) may be used over the potato P if desired. This guard 92 may become the "handle" of the crank arm 88.

The top wall 20 of the cover 18 is formed as shown in FIGS. 1, 2 and 3 with a gently declining approach plane 100. Angularly disposed across and spaced above the approach plane is fixed cutter knife 102 which is mounted on the top wall by means not shown. As a result of this structure (FIG. 3) when the crank arm 88 carrying the potato P (FIG. 3) is drawn back and forth along the approach plane 100 and past the cutter or blade 102 with a slight downward pressure on the potato P, successive slices or chips C are severed off the bottom of the raw potato to fall into the container.

At the same time, with the basket in the position shown in FIG. 2, by virtue of the one-way clutch 80, the shaft 42 and basket 50 are indexed around in a step-by-step rotary motion assuring that the most recently cut chip C does not land on a previously cut chip but instead falls into a area in the basket where it will not contact and stick to the previously made chip.

Completing the assembly is a boomerang-shaped guard 110 which is pivoted as at 112 to the top wall 20. The distal end 114 of the guard covers the knife 102 when chip cutting is finished and is a safety feature. At a distance from the pivot point 112 the guard 110 is provided with a support spool 116 (FIGS. 1, 5) which has an appropriate recess 118 for the shaft 42 when the shaft is in its spin dry position.

Having thus described the structure of an embodiment of the invention, this specification now considers the operation thereof.

In use the container 14 is filled with oil to level O, and the oil is heated by Calrod 16. With the parts arranged as shown in FIG. 2, the detent 40 holds down the shaft 42 by engagement in groove 44. The raw potato P, which may have been shaped appropriately to fit into the opening 90 in the crank arm 88, is drawn back and forth over the cutter 102 to slice off chips C. As stated, because the shaft 42 is being jacked around by the one-way clutch 80, the chips C fall not on each other but in annularly spaced areas in the basket 50.

During cooking and after the chips have all been cut, the basket may be rotated by cranking the crank arm 88 back and forth in oscillating fashion. Because vanes 72 are disposed on the bottom wall 48 of the basket, there is rotary movement of the cooking oil at the same time as the basket is jacked about. This keeps the chips in separated state and assures even cooking.

Figure 5:
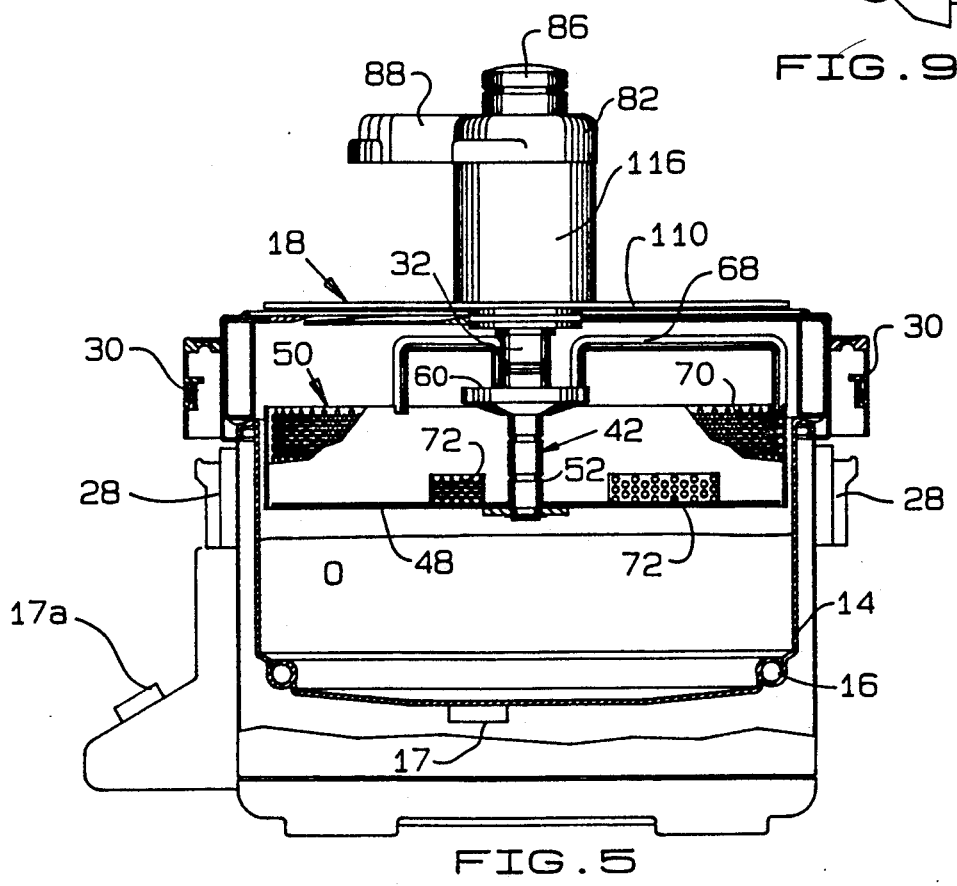
FIG. 5 is a sectional view showing the basket raised.
Figure 6:
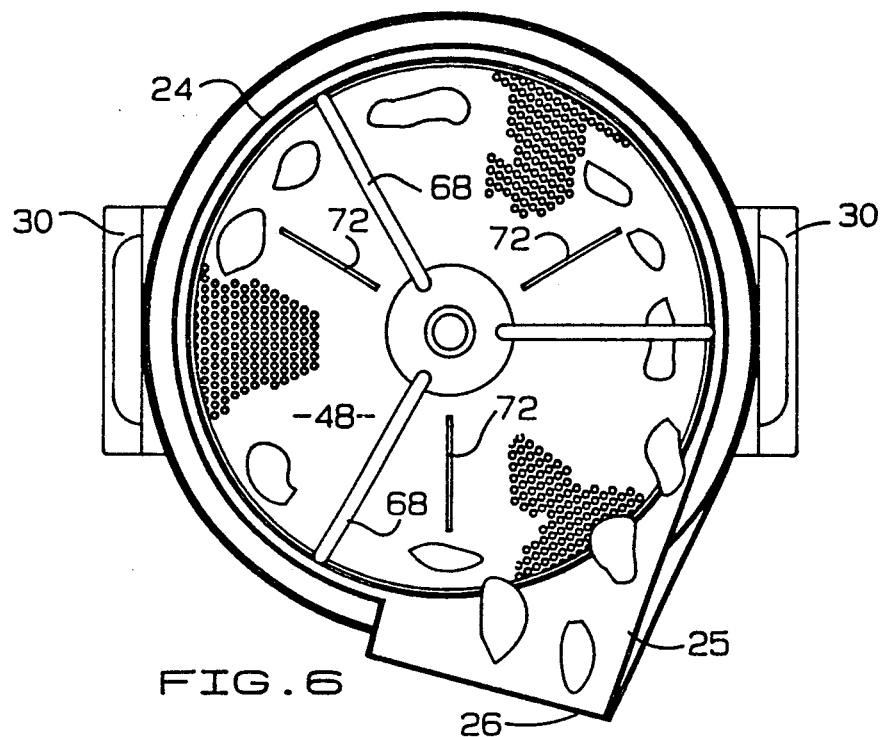
FIG. 6 is a sectional view taken on the line 6—6 of FIG. 7.

With the completion of the cooking, the basket can be raised to the position shown in FIG. 5 wherein the groove 58 is engaged by the spring detent 40. At the same time, the guard 110 may be brought around so that the recess 118 receives the shaft 42 above the top wall 20 and the crank 82 is also supported by the spool 116. In this position the crank arm 80 may be continuously oscillated back and forth or can be rotated to effect the spinning of the basket 50 with a consequent centrifugal separation of oil off the chips which now rest on the bottom wall 48 of the basket. Vanes 72 assure that as the basket 50 rotates, so do the chips. Oil thus separated is thrown outward through the perforations in the side walls 70 to drain down the liner into the oil reservoir.

Figure 7:
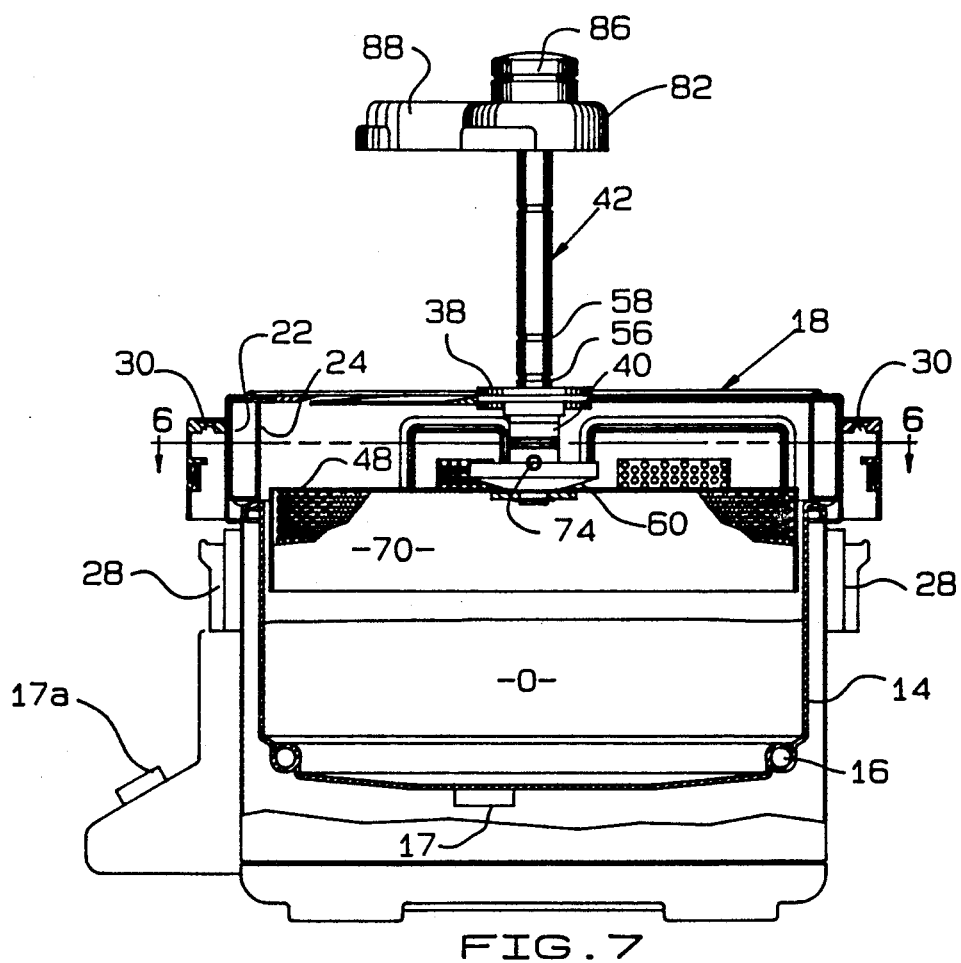
FIG. 7 is a sectional view of the maker with guard removed showing the floor of the basket raised all the way.

After the drying is complete the crank 82 is raised further upward (FIG. 7) so that the detent 40 engages in the groove 54 (FIG. 7). At this point the bottom wall 48 is on a level equal to or above the top of the side wall 70. Detent 52 engages in groove 52 to keep collar 60 down against wall 48. In this condition the crank 88 is turned further to rotate the floor 48 along with its vanes 72. This whirls the chips through the passage 25 and out the door 26 which may be opened for the purpose. As it will be understood, the thin downward runs 69 of the spoke 68 do not interfere with the ejection of the chips off the bottom wall 48 and through the door 26.

The chips emerge from the potato chip maker of the invention uniformly cooked and in a substantially dry but hot condition and are immediately ready for consumption.

While the apparatus of the invention is described as being specifically a potato chip maker, the centrifugal separation device has more general use. For instance, in deep oil frying of other edibles—French fried potatoes, chicken and fish—the centrifugal separation of oil from cooked food may be achieved in the present apparatus. Such other edibles may be fried in the oil after which the basket may be raised and the oil spun outwardly through the basket side wall.

It will be understood that variations in the invention are possible with respect to size and shape of the various parts. However, it should be understood that the invention is not limited to the embodiment shown. The invention may be thought of as having the scope of the following claim language or equivalents thereof.

What is claimed is:

1. A potato chip maker comprising a cylindrical container, a cover for the container, a journal mounted vertically in the center of the cover, a shaft extending down through the journal, a perforate cylindrical basket mounted in its center on the bottom of the shaft, means for raising the shaft and holding the shaft in raised condition, a crank coupled to the upper end of the shaft by one-way clutch, the distal end of the crank mounting a potato holder offset from the shaft and having an open bottom, the cover being formed with an inlet opening offset from the shaft equal to the offset of the holder, a cutter disposed over the opening and parallel to the cover and spaced thereabove a distance equal to the thickness of a potato chip.

2. A potato chip maker as claimed in claim 1 wherein the side wall of the basket is separately supported from the floor of the basket and the floor may be raised above the side wall during discharge of the product.

3. A potato chip maker as claimed in claim 2 wherein the cover has a top wall and a side wall and the side wall of the cover has a normally closed discharge opening.

4. A potato chip maker as claimed in claim 2 wherein the side wall of the basket is supported from its upper end by a spider having a central hub upwardly offset from the side wall of the basket so that the floor can be supported above the side wall and chips on the floor can be centrifically discharged through the spider.

5. A potato chip maker as claimed in claim 4 wherein the detent means are provided to hold the spider on the shaft at a level at which the floor aligns with the lower end of the side wall of the basket.

6. A potato chip maker as claimed in claim 1 wherein the basket has vanes.

7. A potato chip maker as claimed in claim 1 including additionally a cutter guard over the cutter, the guard being pivoted on the shaft so that it may cover the cutter when the cutter is not in use.

8. A potato chip maker comprising
(a) an open-top container having heating means associated therewith,
(b) a cover having a top wall and a side wall and adapted to removably fit over and close the top of the container and being formed with a potato-receiving opening in the top wall offset from the center thereof and a normally closed discharge opening in the side wall,
(c) vertical journal means mounted in the center of the cover,
(d) a shaft rotatably disposed in the journal
(e) a two-piece cylindrical basket having a perforate circular floor with radial vanes therein, the floor being fixedly mounted at its center on the lower end of the shaft, and an annular perforate side wall supported from its upper end by an inward spider, the spider having a central hub above the side wall and having an opening receiving the shaft,
(f) detent means releasably fixing the position of the spider on the shaft,
(g) crank means above the cover and fastened to the shaft by one-way clutch means,
(h) cutter means mounted on and parallel to the cover and disposed over the opening and spaced thereabove a distance equal to the thickness of a potato chip,
(i) potato-holding means having an open lower end and mounted on the outer end of the crank and disposed radially outward from the center of the cover a distance equal to the offset of the potato-receiving opening,
(j) means for raising the shaft and holding it raised so that the perforate floor of the basket is above the side wall and on a level with the discharge opening.

9. A potato chip maker as claimed in claim 8 including additionally a guard pivoted to the shaft above the top wall and may be pivoted over the cutter when the cutter is not in use.

* * * * *